(12) United States Patent
Bate et al.

(10) Patent No.: US 7,185,047 B1
(45) Date of Patent: Feb. 27, 2007

(54) CACHING AND ACCESSING RIGHTS IN A DISTRIBUTED COMPUTING SYSTEM

(75) Inventors: Lyle Bate, American Fork, UT (US); Stephen R. Carter, Spanish Fork, UT (US); Carlos A. Nevarez, Orem, UT (US)

(73) Assignee: Novell, Inc., Provo, UT (US)

( * ) Notice: Subject to any disclaimer, the term of this patent is extended or adjusted under 35 U.S.C. 154(b) by 759 days.

(21) Appl. No.: 09/450,867

(22) Filed: Nov. 30, 1999

Related U.S. Application Data

(63) Continuation-in-part of application No. 09/252,435, filed on Feb. 18, 1999, now Pat. No. 6,601,171.

(51) Int. Cl.
*G06F 15/16* (2006.01)
*H04N 7/16* (2006.01)

(52) U.S. Cl. .............................. 709/202; 709/25; 726/17
(58) Field of Classification Search ................ 709/203, 709/219, 225, 229, 202; 710/36, 244; 713/155, 713/156, 161, 175, 182, 185, 201; 725/22, 725/30; 340/5.2, 5.5; 726/717
See application file for complete search history.

(56) References Cited

U.S. PATENT DOCUMENTS

| | | | |
|---|---|---|---|
| 5,483,596 A * | 1/1996 | Rosenow et al. | |
| 5,678,041 A * | 10/1997 | Baker et al. ................... | 707/9 |
| 5,708,780 A * | 1/1998 | Levergood et al. | |
| 5,848,231 A * | 12/1998 | Teitelbaum et al. | |
| 5,889,952 A | 3/1999 | Hunnicutt et al. | |
| 6,003,135 A * | 12/1999 | Bialick et al. .............. | 713/201 |
| 6,018,724 A * | 1/2000 | Arent | |
| 6,047,377 A * | 4/2000 | Gong .......................... | 713/201 |
| 6,141,778 A * | 10/2000 | Kane et al. | |
| 6,148,404 A * | 11/2000 | Yatsukawa | |
| 6,154,741 A * | 11/2000 | Feldman | |
| 6,157,953 A * | 12/2000 | Chang et al. ................ | 709/225 |
| 6,161,139 A * | 12/2000 | Win et al. .................... | 709/225 |
| 6,182,142 B1 * | 1/2001 | Win et al. .................... | 709/229 |
| 6,223,291 B1 * | 4/2001 | Puhl et al. .................... | 713/201 |
| 6,226,744 B1 * | 5/2001 | Murphy et al. | |
| 6,249,868 B1 * | 6/2001 | Sherman et al. ............ | 713/168 |
| 6,256,739 B1 * | 7/2001 | Skopp et al. ................ | 713/201 |
| 6,272,631 B1 * | 8/2001 | Thomlinson et al. ....... | 713/155 |
| 6,304,907 B1 * | 10/2001 | Keronen et al. ............ | 709/229 |
| 6,336,186 B1 * | 1/2002 | Dyksterhouse et al. ..... | 713/156 |
| 6,353,886 B1 * | 3/2002 | Howard et al. ............. | 713/156 |
| 6,421,669 B1 * | 7/2002 | Gilmour et al. | |
| 6,453,353 B1 * | 9/2002 | Win et al. .................... | 209/229 |
| 2002/0002688 A1 * | 1/2002 | Gregg et al. | |
| 2002/0016790 A1 * | 2/2002 | Arnold et al. | |

* cited by examiner

*Primary Examiner*—Andrew Caldwell
*Assistant Examiner*—Stephan Willett
(74) *Attorney, Agent, or Firm*—Haynes and Boone, LLP

(57) ABSTRACT

A system and method for caching and accessing rights in a distributed computing system is disclosed. An agent, that is located on a Distributed Deputization Point (DPP) parses a directory service. The agent then updates the rights to an Access Control List (ACL) cache. The ACL cache then receives, from an authenticated user, a request for the rights. The ACL cache retrieves the rights and forwards them to the user. The user may now access certain resources based on the rights it has obtained the first time it accesses these resources. Additionally, if the user attempts to access certain resources that are not contained in the ACL cache, a resource manger is invoked which provides the access control rights for the missing resources to the ACL cache.

32 Claims, 8 Drawing Sheets

| TABLE 1 ||
|---|---|
| RESOURCE NAME | PRINCIPAL NAMES/ I.D.'s FOR THOSE ALLOWED ACCESS TO THE RESOURCE |
| A | I.D.1, I.D.2, I.D.3, ... |
| B | I.D.2, I.D.4, ... |
| C | |
| ⋮ | ⋮ |

| TABLE 2 ||
|---|---|
| I.D. | CACHED RIGHTS |
| I.D.3 | X, Y, Z |

| TABLE 3 ||
|---|---|
| I.D. | CACHED RESOURCE OBJECT |
| I.D.3 | |

*Fig. 10*

CACHING AND ACCESSING RIGHTS IN A DISTRIBUTED COMPUTING SYSTEM

CROSS REFERENCE

This application is a Continuation-In-Part of U.S. patent application Ser. No. 09/252,435, filed on Feb. 18, 1999 now U.S. Pat. No. 6,601,171, entitled DEPUTIZATION IN A DISTRIBUTED COMPUTING SYSTEM, assigned to the assignee of the present application, and incorporated by reference herein.

BACKGROUND

The present invention relates generally to the caching and accessing of rights in a distributed computing system. More particularly, the present invention relates to the caching and accessing of rights (or permissions) to and from an access control list in the distributed computing system.

Distributed computing systems are becoming increasingly useful and prevalent. Distributed computers are connected by local area networks, wide area networks, and networks of networks, such as the Internet. These distributed computing systems make available platform-neutral, mobile code environments which contain a growing collection of computational objects, applications, data, and other information in the form of files, databases, images, and/or other named resources.

With the growth of such distributed computing systems and their information content, there is an urgent need to support the efficient and effective caching and accessing of rights across heterogeneous systems, services, and platforms. Powerful and convenient caching services are needed to control access by users to various resources (e.g. files) available on the distributed systems. A user requesting a resource on a distributed system may be local to the system or may be remotely accessing the system. Access to the system may be allowed via a user's unique name and password or, a user may anonymously access the system. In an anonymous access, such as accessing the internet, the user will typically have limited access to the various resources found on the system. However, as the number of unique and anonymous users accessing distributed systems continues to grow, there will be an ever increasing number of resources being accessed.

Various approaches have been applied to the problem of providing effective and efficient caching services in a distributed computing system to handle the increasing number of resources being accessed. Some of these prior art approaches, such as those described in U.S. Pat. No. 5,889,952, have utilized an access control list (ACL) to define the extent to which different users will be allowed to access different resources on a distributed computer (or server). An ACL contains information which allows the operating system of a server to determine if a particular user has been granted access rights for a particular resource requested by the user. According to the prior art, each restricted resource has associated with it an ACL which lists the users granted access to the resource. Depending on the level of access control implemented on a given server, ACLs might be associated with disks, with files, or with other storage volumes. In an operating system where ACLs are associated with disks, an ACL for a given disk defines the access restrictions for all the resources of files stored on that disk. In an operating system where ACLs are associated with files, access by users is separately controlled for each file.

The flexibility and system performance offered by file level access control is significant. However, the number of access checks performed by such a system is increased dramatically as compared to a system where access control is maintained only at the disk level. As with all operations of an operating system, performing an access check in response to a user request for a resource requires processing time of the central processing unit ("CPU time"). When a server is handling a large number of file requests, a significant amount of CPU time can be consumed by performing the necessary access checks. In a system employing file-level access control lists, the access control list is part of each individual file-object. When a request for a given file-object is received, the operating system identifies the requesting user, opens the requested file-object, reads the access control list to determine if the user has the necessary access rights, and then delivers the file-object to the requesting user (if the user has the necessary access rights). Therefore, it is necessary to open a requested file-object to perform the access check each time a file is requested.

The file-open operation consumes a great deal of CPU time. In a server receiving frequent file requests, the need to open every requested file-object to check the access control list is very expensive in terms of CPU time. To overcome this limitation, U.S. Pat. No. 5,889,952 describes an access permission caching system that performs the necessary access check, even at the file-level of access control, without the relatively slow operation of opening the requested file-object to check the associated ACL. This system stores the most recently generated access-permissions. If a request arrives at the server that is similar, in terms of the requesting user and the requested resource, to a previously processed request, then the system locates the previously generated access-permission in the ACL. The requesting user's access-permission is therefore determined without opening the requested resource to read the associated access control list.

This prior approach, however, contains a number of limitations. For example, a request must have been previously processed and its permissions stored in the ACL before these permissions can be provided to a similar future request. Thus, extra processing is needed to initially place the permissions in the ACL. Additionally, access controls for a set of permissions may not be located on the ACL. This prior art approach does not provision for the scenario when a set of access controls of a first resource located in the ACL do not match a different set of access controls of a second resource in the system. In such an instance, it will be difficult for the access controls in the ACL to determine the equivalent access controls in the system.

Therefore, an improved system for caching and accessing rights to and from an ACL in a distributed computing system is desired to reduce or eliminate the prior art limitations and design complexities.

SUMMARY

In response to these and other limitations, provided herein is a unique system and method for caching and accessing rights to and from an access control list (ACL) cache in a distributed computing system. In one embodiment, an agent that is located on a Distributed Deputization Point (DPP) parses a directory service. The directory service includes the rights, or permissions, of various principals (such as users or groups) to certain resources. When a principal becomes deputized, certain rights are delegated to the principal which expressly identify the entities involved in the delegation.

For example, a user logs in and sends an authentication request to one of the DDPs. The "user" may be a user task for a human who is using the system, or it may be a system task which is created by the system software or by some application program. Login might be unnecessary for system tasks. The authentication request identifies the user by a user name, a user ID number, or the like. Familiar or novel authentication mechanisms may be used, including biometric readings, a smart card, and so on. The authentication request may include a logon certificate, a password, or another credential to prove that the user has the right to operate under the specified user name or user ID.

Assuming the credential and/or other authentication information is accepted by the DDP as legitimate, the user receives an authentication response. The authentication response includes an indication that the user is now authenticated, and may also include a credential identifying the rights (received from a user ACL cache discussed in FIG. 9) granted to the user as a result of the authentication. Tasks created by the distributed computing system may also authenticate themselves to a DDP. In particular, deputized agents previously created by or on behalf of a DDP can in turn authenticate themselves to the same or another DDP in order to create additional deputies.

After the agent accesses (which may include parsing) the directory service, the agent updates the rights to an ACL cache. It is understood that the DDP, directory service, ACL cache, and principal may all be located on one or more computers and are connected (either directly or remotely) via a plurality of communication links. The ACL cache then receives, from the authenticated user, a request for the rights. The ACL cache retrieves the rights and forwards them to the user. The user may now access certain resources based on the rights it has obtained. Thus, the first request from an authorized user results in the rights for that user. As such, processing time can be minimized thereby improving system efficiency and quality.

In some embodiments, the ACL cache includes a plurality of tables. A first table includes the principals that have access to various resources. A second table includes the rights of the principals to the resources. A third table includes the resources that have access to the principals.

In some embodiments, the first table may not contain the principal that has access to the resource. In such a scenario, the directory service invokes a resource manager that is coupled to the directory service, includes access information of the principal to the resource, and further includes rights of the principal to the resource. The resource manager, which may be located on one or more of the computers and is connected to the other entities in the system via the communication links, can then map access controls of the rights in the resource manager to access controls of the rights in the directory service. The resource manager can then update the mapped access control of the rights to the ACL cache.

These advantages, as well as others which will become apparent, are described in greater detail with respect to the drawings and the following discussion.

BRIEF DESCRIPTION OF THE DRAWINGS

FIG. 10 is a diagram illustrating the various tables in the ACL cache of the inventive distributed computing system.

DETAILED DESCRIPTION

Figure 1:
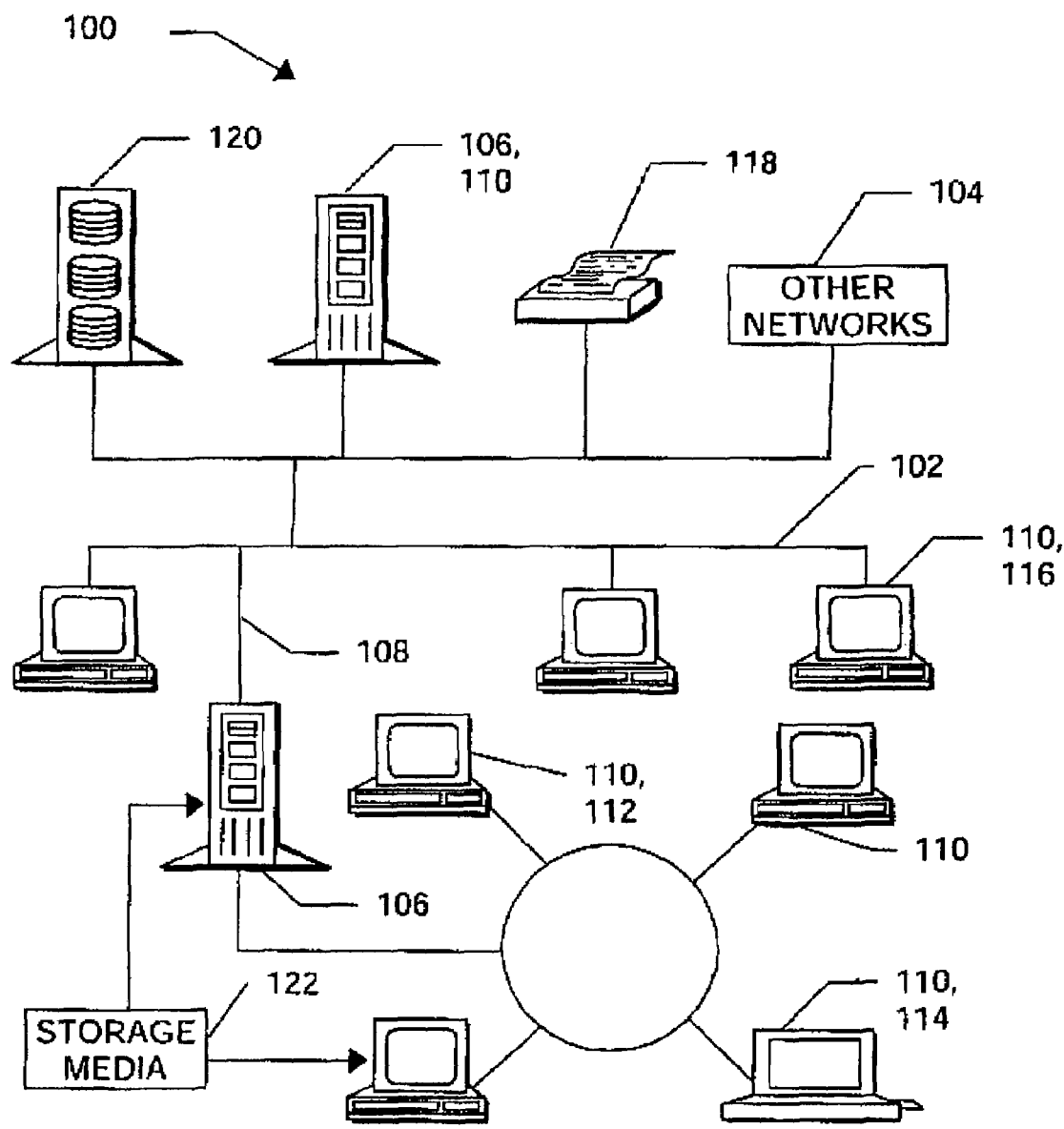
FIG. 1 is a diagram illustrating one of the many distributed computing systems suitable for use according to the present invention.

The present invention relates to methods, systems, signals, and devices for caching and accessing rights in a computer network or other distributed computing system. In particular, the invention provides and uses tools and techniques for caching and accessing rights via an access control list (ACL) cache. Various components of the invention and its environment are discussed below.

Deputization

Deputization is a particular type of rights delegation. Deputization provides secure delegation in distributed computing environments having one or more computer networks, including environments which support a "network login" instead of requiring a user to log in separately to each network server.

Unlike some other approaches to delegation, deputization is not key-centric. Entity identifiers such as distinguished names are used together with cryptographic keys to make secure delegations. Through deputization, rights are delegated from one identified entity to another identified entity. Deputization does not require that one entity impersonate another entity.

Using deputies which have their own identities allows the delegation of rights across boundaries such as the boundary between two namespaces and/or two networks. A chain or tree of deputies can also be created, since a deputy can delegate rights to other deputies.

The deputies are trusted because they have certificates or credentials which are digitally signed by a known and trusted Distributed Deputization Point ("DDP"). A deputy operating through deputy credentials can create other deputies using the same or different DDPs. This allows one or a few initial deputies to cover significant territory by creating other deputies from a pool of known DDPs and sending these deputies out to perform some distributed task such as a computation or a database query. For example, suppose a task can be performed only within certain hours of the day. A pool of known DDPs is located using a directory service such as Novell Directory Services or a Lightweight Directory Access Protocol service. The pool lists the DDPs and their operating hours. The user deputizes an initial agent, which waits until the DDP pool is operational and then deputizes other agents via the DDPs to perform the task.

Deputization according to the invention does not require a global namespace, although it may use one. For instance, deputies can log onto a system described by the Distributed Authentication Security Service. A namespace that is managed by a distributed directory using NDS, LDAP or other means can use a DDP to create a deputy credential which is acceptable to one or more other namespaces. Thus, it is not necessary that the initial principal be globally known in every namespace that ultimately contains a deputy in that principal's deputization tree. Each deputy can create or receive its own identity before receiving the rights and permissions stated in the deputy credential, if the DDP knows about the node to be logged onto and the new deputy ID is available on the target system.

Providing deputies with separate identities also allows deputies to live on after the user session is over. A deputy of a deputy may likewise live on after the first deputy finishes.

Computers, and Networks Generally

Distributed computing systems which may be configured according to the invention include computer networks, both individually and in aggregations, as well as mobile computers which are connectable to such networks. By way of example, suitable computer networks include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

One of the many computer networks suited for use with the present invention is indicated generally at 100 in FIG. 1. In one embodiment, the system 100 includes Novell NetWare network operating system software (NOVELL and NETWARE are registered trademarks of Novell, Inc.). In alternative embodiments, the system 100 includes NetWare Connect Services, VINES, Windows NT, Windows 95, Windows 2000, any embedded operating system, LAN Manager, LANtastic network operating system software and/or an implementation of a distributed hierarchical partitioned object database according to the X.500 protocol such as Novell Directory Services or Lightweight Directory Access Protocol ("LDAP") directory services (NOVELL DIRECTORY SERVICES is a registered trademark of Novell, Inc.; VINES is a trademark of Banyan Systems; NT, WINDOWS 95, WINDOWS 2000, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several file or object servers 106 that are connected by network signal lines 108 to one or more network clients 110. The servers 106 and clients 110 may be configured by those of skill in the art in a wide variety of ways to operate according to the present invention. The servers 106 may be configured as Internet servers, as intranet servers, as directory service providers or name servers, as software component (e.g., COM or Java) or other object servers, or as a combination thereof. The servers 106 may be uniprocessor or multiprocessor machines. The servers 106 and clients 110 each include an addressable storage medium such as random access memory and/or a nonvolatile storage medium such as a magnetic or optical disk.

Suitable network clients 110 include, without limitation, personal computers 112, laptops 114, workstations 116, dumb terminals, information appliances, personal digital assistants, and other handheld and/or embedded processing systems. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

In addition to the network client computers 110, a printer 118 and an array of disks 120 are also attached to the particular system 100 shown, as examples of other network nodes or devices. A given computer may function both as a client 110 and as a server 106; this may occur, for instance, on computers running Microsoft Windows NT or Windows 2000 software. Although particular individual and network computer systems and components are shown, those of skill in the art will appreciate that the present invention also works with a variety of other networks and computers.

The servers 106 and the clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or network clients 110 to perform caching and other steps of the present invention substantially as described herein.

Data Flow Generally

Figure 2:
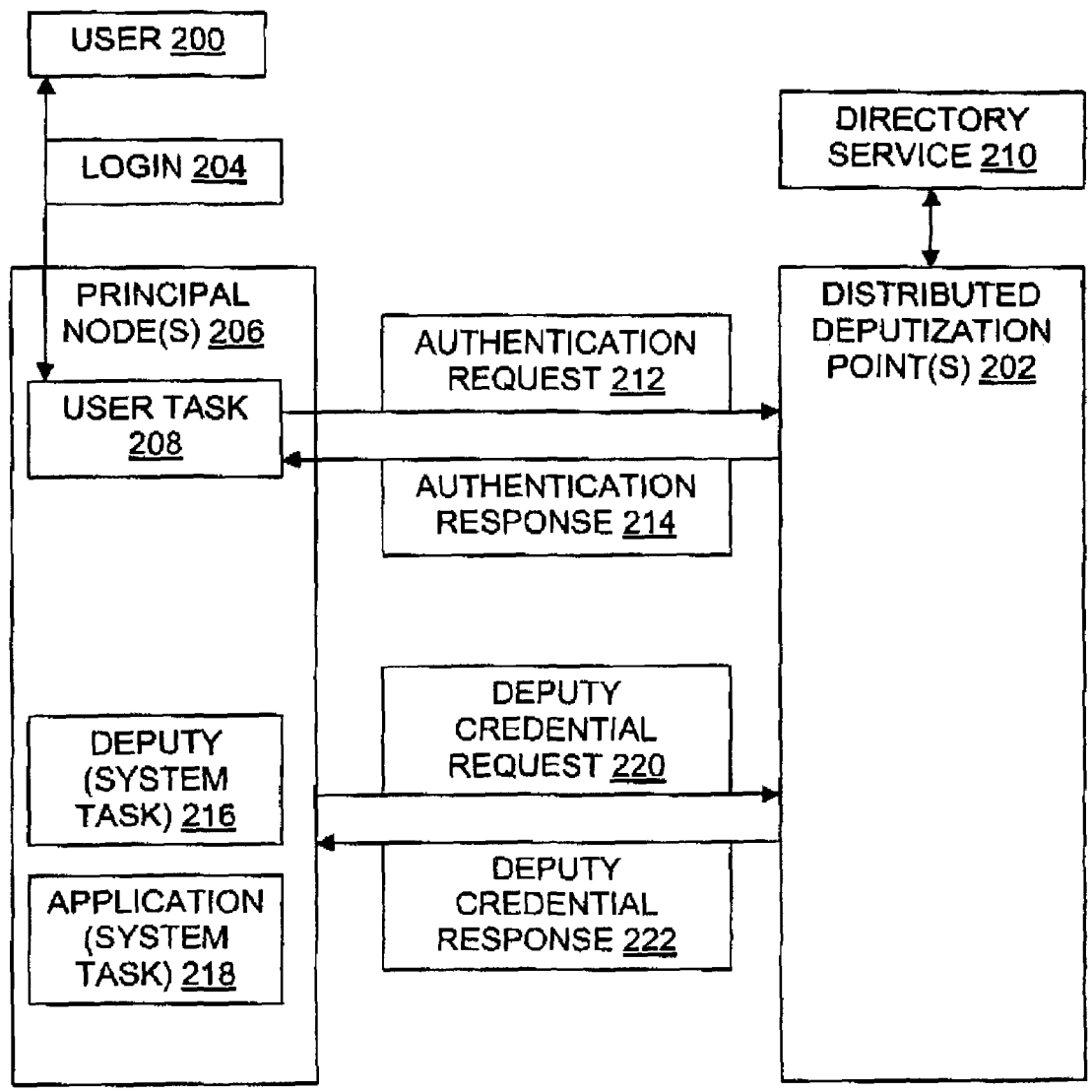
FIG. 2 is a data flow diagram illustrating selected components of the inventive distributed computing system and information communicated between those components.

FIG. 2 illustrates generally the flow of data in a distributed computing system, such as the system 100, during a deputization according to the invention. A user 200 wishes to be authenticated to a distributed deputization point (DDP) 202 in order to delegate rights to one or more deputies. The user 200 first logs into the system 100 by exchanging login information 204 with a server 106. The server 106 will act as a principal node 206, that is, as a node 206 which represents a principal (one who delegates rights). The login information 204 exchange may be automatic if the user 200 is already logged into a client 110 that communicates with the principal node 206, or it may be done expressly at the user's request.

A user task 208 on the principal node 206 represents the user 200 for delegation purposes. The user task 208 is one example of a principal; other examples discussed below include tasks created by other software running on the system 100.

The user task 208 locates the distributed deputization point 202 using a directory service 210 or other means, and then sends the DDP 202 an authentication request 212. The authentication request 212 identifies the user 200 by a username, a user ID number, or other identifier. The authentication request 212 may include a logon certificate, a password, or another credential to prove that the user 200 has the right to log onto the system 100 under the specified user name or user ID.

The distributed deputization point 202 checks the authentication request 212 and either recognizes or refuses to recognize the user task 208 as authentic. If recognition is refused, error messages may be sent to a network or system administrator, a log entry may be made, and other steps familiar to those of skill in the art may be taken to inform the user 200 and/or system administrators as appropriate.

Assuming that the authentication request 212 is accepted by the distributed deputizing point 202 as legitimate, the DDP 202 then sends the user an authentication response 214. The authentication response 214 includes an indication that the user 200 is now authenticated, and may also include a credential identifying the permissions granted to the user 200 as a result of the authentication. Such a credential is not necessary, but merely provides one way to authenticate the user task 208 to the DDP 202 and to maintain that authentication. Authentication information may also be maintained in the DDP 202 or in some system data structure accessible to the DDP 202.

Principals may be user tasks 208, or they may be other tasks. For instance, a task created by an operating system, by an application program, or by other software may also act as a principal by using the DDP 202 to delegate rights to deputies. In particular, a deputy 216 which was previously created according to the invention may be a principal that creates its own deputies. Likewise, an application program 218 may use the DDP 202 to create deputies. User tasks 208, deputies 216, and applications 218 are collectively referred to herein as "principals." In some cases, deputies 216 and/or applications 218 may already be authenticated to the DDP 202, making an authentication request 212 and corresponding response 214 unnecessary.

In any case, the principal 208, 216, or 218 sends the DDP 202 a deputy credential request 220. The deputy credential request 220 either contains the public key of the proposed deputy, or identifies the deputy so the DDP 202 can request the deputy's public key from a repository, or presumes that the DDP 202 will obtain the deputy identity after creating the deputy. The repository may be part of a familiar public key infrastructure, and certification authorities of the type familiar in the art may be used. If the deputy's public key is provided, then the deputy credential request 220 also contains the private key of the proposed deputy encrypted with the user's public key. In addition, the request 220 identifies the principal and proves that the principal is authorized to create deputies.

The maximum life span of the deputization may also be provided to the DDP 202 by the principal. Alternatively, the DDP 202 may use a default value, or it may override the value requested by the principal. In some embodiments, no maximum life span is specified, and deputizations are good until expressly revoked.

The permissions to be granted to the deputy by the principal may also be specified to the DDP 202 by the principal. These permissions must be the same as, or a proper subset of, the permissions currently held by the principal. Alternatively, the request 220 need not specify the deputy permissions, in which case the DDP 202 can use a default value or can simply make the permissions the same as the principal's.

In response to the deputy credential request 220, the DDP 202 creates a deputy credential and/or deputy certificate. In general, a deputy credential contains the principal's identity, the permissions being delegated to the deputy by the principal, the deputy's private key encrypted with the principal's public key, and the digital signature of the DDP 202. A deputy certificate contains information such as the deputy's public key, the rights granted, and the life span of the certificate.

Once a principal has a deputy certificate, it can use that certificate to deputize individual functions, agents, and/or other entities as deputies. Any access point in any network in the system 100 which can authenticate the deputy certificate can then authenticate the deputy to permit access to network resources in accordance with the rights and permissions granted in the deputy certificate. Multiple deputy certificates from one or more principals may be used to provide aggregate access and permission lists, so long as each deputy certificate can be authenticated by the site in question.

As a result, deputies of a principal can be given certain access and permission to network resources without the principal being present to authenticate all their requests. Requests made using a deputy certificate are as good as requests made by the principal itself, so long as the deputization has not expired or been revoked.

Deputization Chains and Trees

Figure 3:
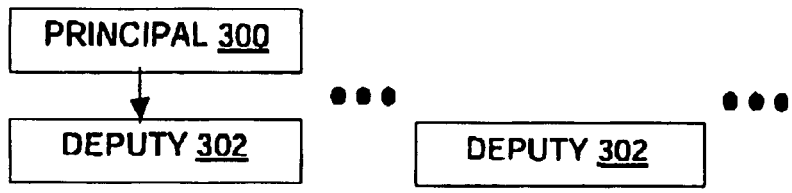
FIG. 3 is a diagram illustrating a principal, a deputy of the principal according to the invention, and the relative persistence of the principal and deputies over time.
Figure 4:
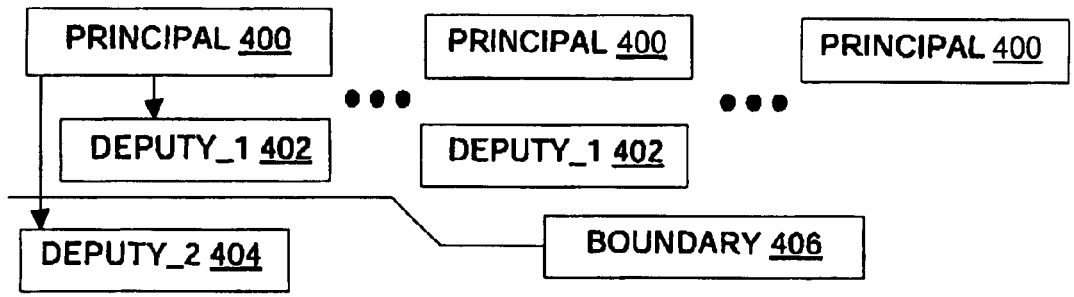
FIG. 4 is a diagram illustrating a principal, two deputies of the principal according to the invention, the relative persistence of the principal and the deputies over time, and a boundary such as a boundary between namespaces and/or networks.
Figure 5:
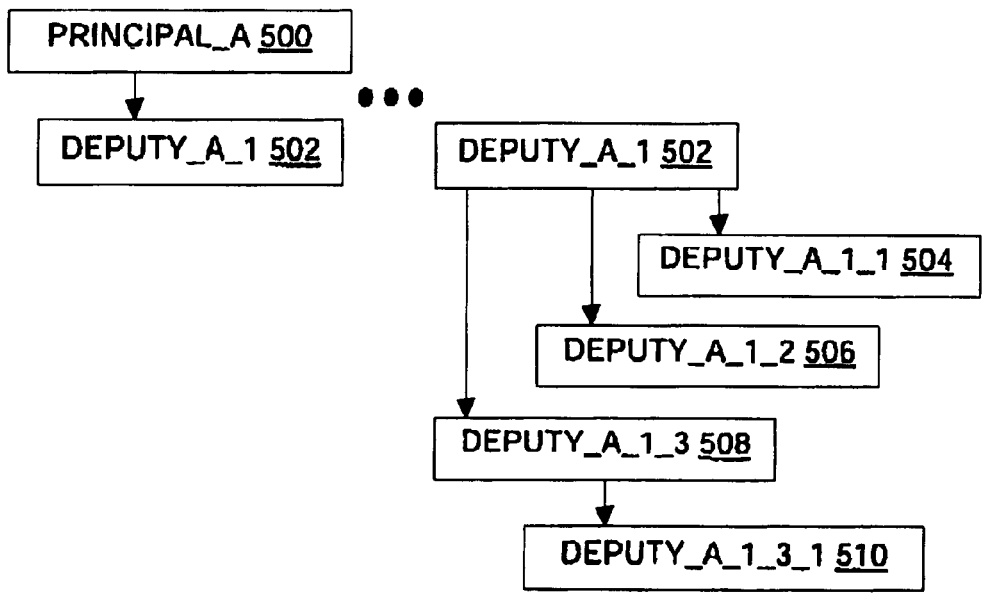
FIG. 5 is a diagram illustrating a principal, a deputy deputized directly by the principal according to the invention, and several deputies in a tree of deputies which have been directly or indirectly delegated rights from the principal according to the invention.

FIGS. 3 through 5 show a few of the many possible configurations of principals and deputies which are possible according to the present invention. FIG. 3 illustrates a relatively simple configuration, in which one principal 300 uses a distributed deputization point to delegate rights to one deputy 302. This is shown in the leftmost column of FIG. 3. Since the deputy 302 has an identity separate from that of the principal 300, the deputy 302 can persist even after the principal 300 is no longer present on the system. This is indicated in the center column of FIG. 3, with the passage of time being indicated by the ellipsis between the columns. As shown in a third, rightmost column which contains neither the principal 300 nor the deputy 302, the deputy 302 can subsequently terminate itself once it has performed the task assigned to it.

FIG. 4 illustrates a more complex configuration. A principal 400 delegates rights to two different deputies 402, 404. The two deputies 402, 404 may receive the same rights or they may receive different rights, depending on the circumstances. Several deputies of a given principal may all operate in a homogeneous region such as a given namespace and/or network. However, as indicated by a boundary marker 406, different deputies of a given principal may also operate in different regions. FIG. 4 also illustrates the fact that deputies do not necessarily outlive their principal. As shown, the principal 400 and the first deputy 402 outlive the second deputy 404, and the principal 400 continues operating on the system even after the first deputy 402 expires, terminates itself, is terminated, or otherwise stops executing.

FIG. 5 illustrates a configuration in which a deputy also serves as a principal. Thus, a principal 500 delegates rights to a first deputy 502. After the principal 500 exits the system, the first deputy acts as a principal by delegating rights to three additional deputies 504, 506, 508. The last deputy 508 in turn delegates rights to another deputy 510. The collection which includes the principal 500 and the deputies 502, 508, and 510 is an example of a deputization chain. The entire illustrated configuration, containing the principal 500 and the deputies 502 through 510, is an example of a deputization tree.

Other configurations are also possible. In particular, more or fewer principals, deputies, and/or boundaries may be present in a given configuration under the invention. Relative life spans of principals and deputies may also differ from those shown, and differently sized and shaped deputization chains and trees may occur.

Deputization Signals Generally

Figure 6:
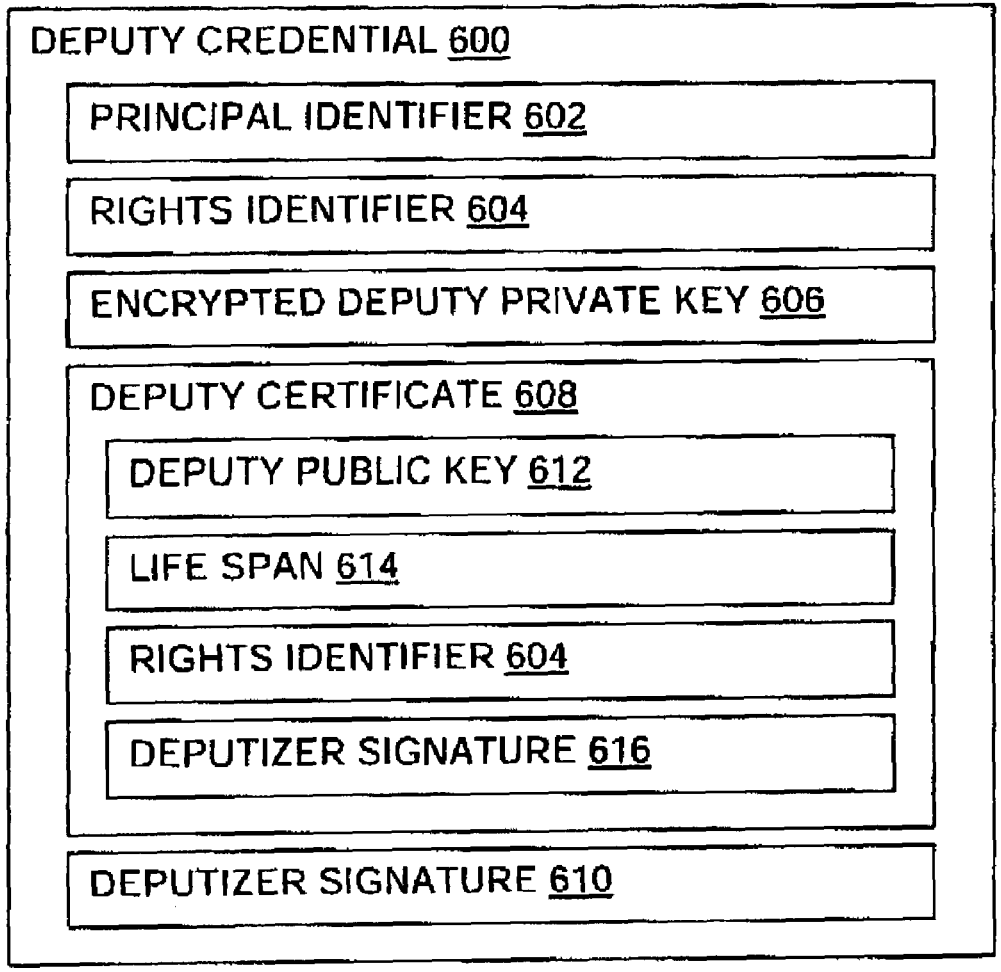
FIG. 6 is a diagram illustrating the structure of a deputy credential signal according to the present invention.
Figure 7:
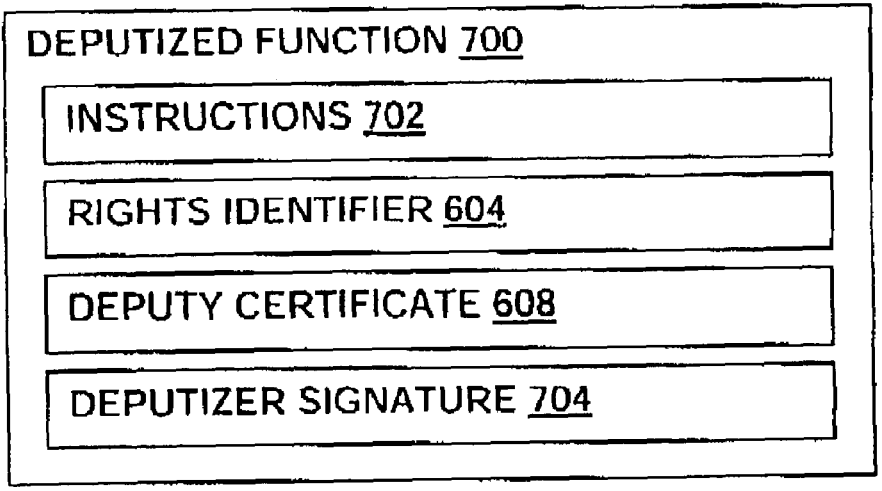
FIG. 7 is a diagram illustrating the structure of a deputized function signal according to the present invention.

FIGS. 6 and 7 illustrate deputization signals according to the present invention. A deputy credential 600 is created by a distributed deputization point 202 in response to a request by a principal, as noted above in connection with FIG. 2. The deputy credential 600 includes a principal identifier 602 which identifies the principal that will delegate rights through the deputy credential 600. The principal identifier 602 may include a distinguished name, tuned name, GUID or UUID, uniform resource locator, network address, user name, user ID number, account number, and/or other identification. Unlike key-centric systems, a mere public key is not sufficient identification of the entity which is delegating rights. The rights which the principal has actually delegated are identified in a rights identifier 604. As noted earlier, the distributed deputization point 202 may delegate all of the rights specified by the principal's request 220, or the distributed deputization point 202 may partially or entirely override that request.

The rights identifier 604 may be implemented using bit flags, groups, permissions, access control lists, security labels, clearance levels, and/or other familiar identifications of resource access rights. The deputy credential 600 also includes as a component 606 the private key of the deputy encrypted with the public key of the principal. Any reliable public key mechanism may be used, including without limitation those described in Schneier, Applied Cryptography, ISBN 0-471-59756-2 (1994), and other reference works on public key cryptography.

The deputy certificate 608 in the deputy credential 600 contains additional components, including a public key 612 of the deputy and a life span 614. The life span 614, which is optional, may be used to define the time period over which the delegation of rights memorialized in the deputy credential 600 is valid. Tools and techniques for implementing "total time to live" and other life span components in other contexts (such as in connection with conventional certificates in a public key infrastructure) are familiar to those of skill in the art.

The rights identifier 604 may be repeated in the deputy certificate 608. Repetition may be helpful in an embodiment in which the DDP 202 maintains authentication state in the credential 600. In such cases, the credential 600 is required to authenticate an access request by the deputy and the certificate may be used in one or more other deputizations, for instance. It is also possible to have a credential 600 authenticate the deputy but have all rights and permissions specified at the DDP 202 rather than in the credential 600. As illustrated in FIG. 7, repetition of components may also be appropriate to allow use of the deputy certificate 608 apart from the deputy credential 600.

The deputy certificate 608 and the deputy credential 600 are digitally signed by components 616, 610, respectively, which are digital signatures based on the other contents of the certificate 608 and the other contents of the credential 600, respectively. The digital signatures 616, 610 are created by the distributed deputization point 202 when it creates the certificate 608 and/or credential 600, respectively. Any of a wide variety of familiar digital signature tools and techniques may be used.

FIG. 7 illustrates a deputized function signal 700. The deputized function 700 includes instructions 702 for performing some task on behalf of the principal which delegated rights to the function. The term "instructions" is used broadly, to include computer controlling, informing, and/or recording means such as executable code and data, portable byte codes, scripts, dynamic link libraries, forms, graphics, and/or other code and data needed to perform tasks. The rights delegated are identified in a rights identifier 604 and/or a deputy certificate 608. The instructions 702 and the other components are signed by the distributed deputization point 202 with a signature 704, which is generated in a manner similar to the deputizer signatures 610, 616.

The signals 600, 700 may be implemented in data structures in various ways. For instance, signal components may be placed in a different order from that shown in the figures, may be omitted (unless called for in the appended claims), and may be supplemented with other components such as error detection and correction codes, timestamps, and/or network addresses. A wide variety of data structure field sizes and data encodings are possible. The deputization signals may also be embodied in the system 100 in various media. For instance, they may take the form of data structures stored on a disk or in RAM memory, and/or the form of signals on one or more network communication lines 108.

Deputization Methods Generally

Figure 8:
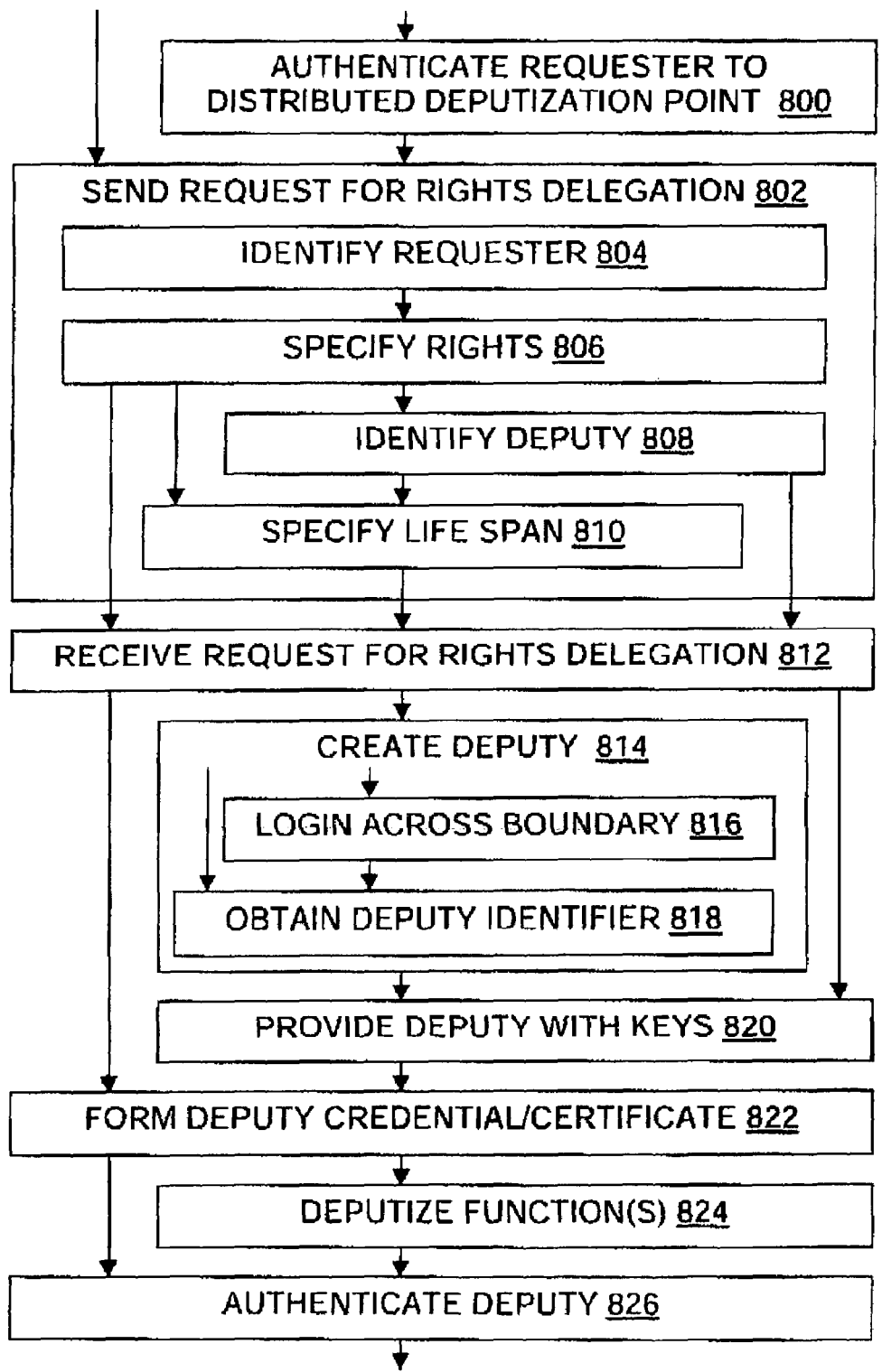
FIG. 8 is a flow chart illustrating several methods of the present invention for delegating rights through deputization in a distributed computing system.

FIG. 8 illustrates methods according to the present invention. The method steps may be implemented and performed in various ways. For instance, steps may be performed concurrently and/or in a different order from that shown, except to the extent that one step requires the results of another step. Steps may also be omitted (unless called for in the claims), and may be supplemented with other steps such as error detection and correction steps, notification and logging steps, and steps which are directed to performing assigned tasks once the deputy or deputies are authenticated. Further, steps may be repeated. In particular, a given principal may delegate rights to several deputies and/or a deputy may delegate rights, as shown in FIGS. 4 and 5, by appropriate repetition of selected steps.

During an authenticating step 800, a principal authenticates itself to one or more distributed deputization points 202. This may be performed as discussed above in connection with the authentication request 212 and authentication response 214. As noted in that discussion, some principals may already be authenticated to the DDP 202 and/or may be pre-authorized under the system so that no authentication step 800 is needed.

A request sending step 802 sends to one or more DDPs 202 one or more requests for rights delegation through deputization. This may be done by transmitting deputy credential requests 220. In particular, the sending step 802 includes a step 804 identifying the requester and a step 806 specifying the rights to be delegated. Suitable data for the steps 804, 806 are discussed above in connection with deputization signal components 602, 604, respectively.

An optional deputy identifying step 808 identifies the deputy to the DDP 202. This step is suitable when the principal wishes to delegate rights to an existing entity. The step 808 may be omitted if the principal wishes to have the DDP 202 spawn new tasks and give them the specified rights. For instance, the principal may desire to deputize entities which are created only after the principal logs off the system, or the principal may wish to deputize entities which are outside the namespace and/or network of the principal but not outside the namespaces and networks available to the DDP 202. In such cases, the deputy identities are not known to the principal, and thus the identifying step 808 is omitted.

A limited life span for one or more of the specified rights, or for the deputy credential 600 and/or deputy certificate 608 as a whole, may be specified by the principal during a step 810. Alternatively, the life span may be specified by the DDP 202, or no life span may be specified.

During a request receiving step 812, one or more DDPs 202 receive the request sent during the step 802. The request identifies the principal and the rights to be delegated. If the principal does not already have a public key and a corresponding private key, it may be prompted at this point to obtain such a key pair, or the DDP 202 may proactively register the principal with a certification authority to obtain a key pair on behalf of the principal. The DDP 202 may itself be a certification authority, that is, it may have certification authority functionality and recognition in addition to the deputization role discussed herein.

If the entity receiving the rights does not already exist, then it is created during a step 814. As noted above, this may involve logging in across a namespace and/or network boundary during a step 816. Regardless, the DDP obtains from the operating system the identifiers of one or more deputy entities during a step 818. During a step 820, each deputy is provided with a public key-private key pair. This may be done by prompting each deputy to obtain such a key pair from a public key infrastructure, or the DDP 202 may obtain or provide the key pairs on behalf of the deputies.

During a forming step 822, the deputy credential and/or deputy certificate is formed. As noted in connection with FIG. 6, the deputy credential identifies the principal, identifies the rights delegated to the deputy by the principal, contains the deputy private key encrypted with the principal public key, contains the deputy public key, and is signed by the distributed deputization point 202. The deputy certificate 608 may be created to group the deputy public key 612 and possibly other components within the deputy credential 600, as discussed in connection with FIGS. 6 and 7. During an optional function deputizing step 824, deputized functions such as those illustrated and discussed in connection with FIG. 7 may be created.

The deputy certificate 608, deputized functions 700, and/or deputy credentials 600 are then utilized during one or more deputy authenticating steps 826. Any access point in any network which can authenticate based on these various deputization structures 600, 608, 700 can authenticate deputy tasks and functions under the invention. This provides a flexible yet secure mechanism for delegating rights within the distributed computing system 100.

Caching and Accessing Rights

Figure 9:
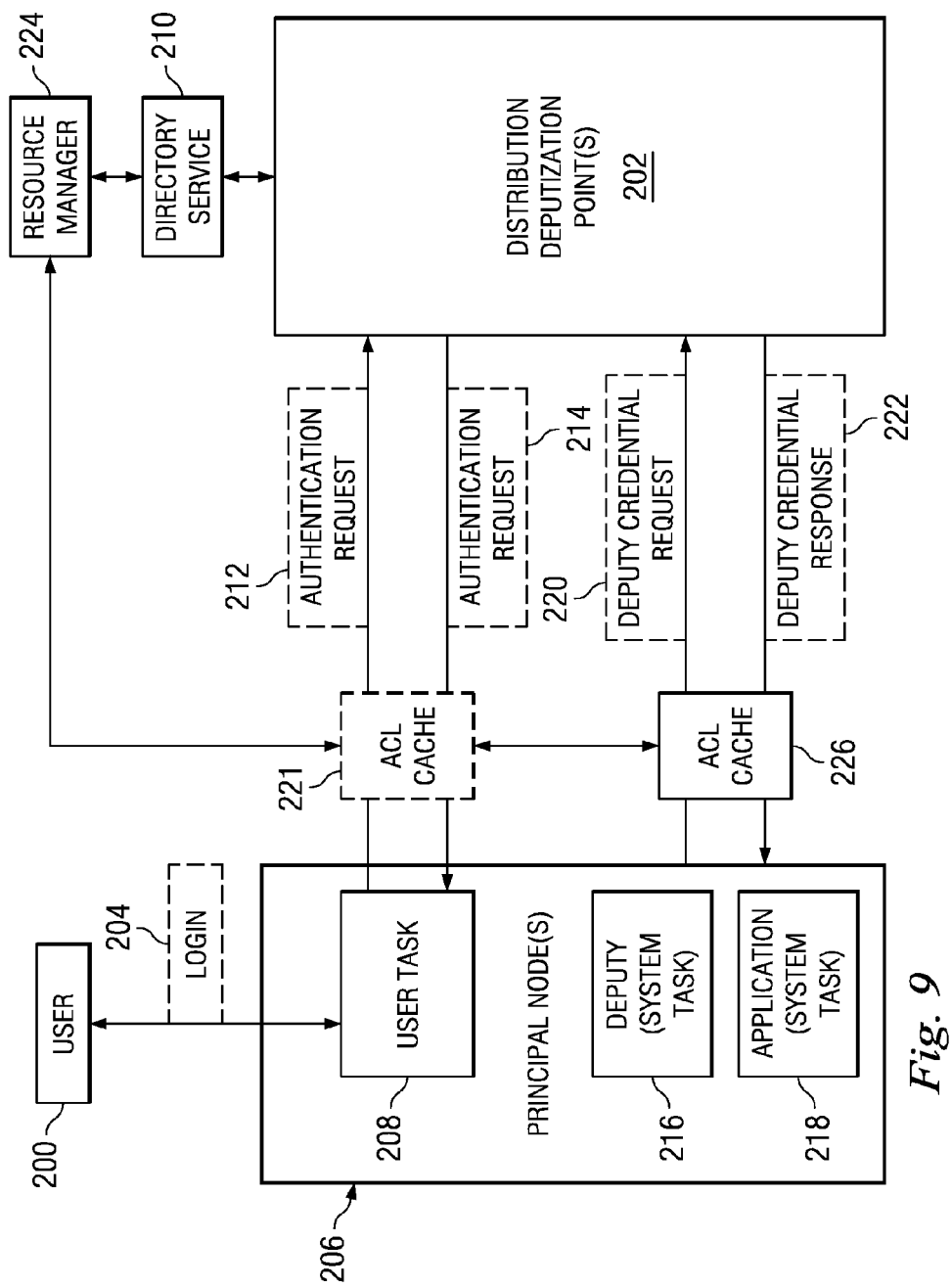
FIG. 9 is a data flow diagram illustrating the ACL cache and resource manager of the inventive distributed computing system and information communicated between those components.

FIG. 9 illustrates generally the flow of data in a distributed computing system, such as the system described in FIG. 2, during the caching and accessing of rights to and from an ACL cache 226 according to the invention. When the deputy credential request 220 is sent by the principal 208, 216, or 218, it is received at the ACL cache 226. The principal 208, 216, or 218 may be requesting its rights to various resources in the system. The ACL cache 226 then retrieves the rights and forwards them (via the deputy credential response 222) to the principal. Prior to the ACL cache 226 receiving the deputy credential request 220, however, an agent (not shown) on the DDP 202, parses the directory service 210 which contains the rights of the principal 208, 216, or 218 to the various system resources. The agent then updates the rights to the ACL cache 226. Thus, when ACL cache 226 first receives the deputy credential request 220, it already contains the rights for the deputy thereby eliminating the need to access the DDP 202.

In an alternate embodiment, a separate ACL cache 227 may contain the user's 200 (or user task's 208) rights to various resources. The rights may already be contained in the cache 227 or, if the cache 227 is coupled to the cache 226, the cache 227 can, based on the user's 200 (or user task's 208) identity received from the authentication request 212, retrieve the user's rights from the cache 227. When the authentication response message 214 is sent from the DDP 202 to the user task 208, it will include the user's 200 rights. Thus, the user 200 will be aware of the rights he/she has to various resource at the time of authentication.

In an alternate embodiment, the ACL cache 226 could be extended to interface with the user task 208 and the DDP 202. In such a scenario, the separate ACL cache 227 would not be needed as the ACL cache 226 could interface with every principal 208, 216, and 218 in the principal node 206.

The agent may synchronously and/or asynchronously update the rights to the ACL cache 226, when the rights are added to and/or removed from the directory service and/or when the request from the principal is received. The agent may also update the ACL cache 226 at a scheduled time (such as a low priority time, when, for example, the CPU demand is low) or after a time to live has expired, thereby causing the ACL cache 226 to re-obtain the rights from the directory service 210 instead of using the existing cached rights.

The ACL cache 226 contains a plurality of tables (1–3) which are described in FIG. 10. Table 1 contains the names or identifiers ("I.D.'s") of the principals that have access to the various system resources. For example, I.D. 1 may pertain to the principal 216 and resource A may pertain to a printer in the system. As such, the principal 216 has access to that particular printer. Table 2 contains the rights that a principal has to a resource. The principal 216 has various rights x, y, and z that pertain, for example, to adding the printer, deleting the printer, and printing from the printer, etc. Continuing with the above example, the principal 216 has the right to print a document via the printer. Table 3 contains the cached access to the resource object which allows certain methods in the object (such as, for example, object authentication) to be accessed faster by the principal 216. Continuing with the above example, the printer's capabilities are cached to allow the principal 216 fast access to those capabilities.

The naming convention utilized in the tables 1–3 can benefit from the use of nametags which are distributed with files, with objects, or with other items. Nametags are used to correlate location-independent logical names with the location of item copies stored in the distributed system. Names can be used by services that enable end-user application programs and by system services to navigate, locate, access, and manipulate mappings between names and specific pieces of digital information such as a file or an object, or between names and specific pieces of equipment such as a printer or a disk array.

If a request from a principal 208, 216 or 218 is received at the ACL cache 226 and the ACL cache does not contain the name or I.D. of the principal (and thus will not contain the rights for that principal), a resource manager 224 is invoked by the directory service 210 (either directly or via the DDP 202). The resource manager 224 is an abstraction that decouples access controls for various resources. The access controls provide various actions that may be performed on a resource. For example, the access controls for a file resource may include a "read", a "write", or a "find." If the ACL cache 226 contains information primarily relating to file rights and a principal request is received at the ACL cache that relates to a newly installed resource, the ACL cache may not have rights information relating to the newly installed resource (such as, for example, an air conditioner). In such a scenario, the resource manager 224 would be invoked and would then map the access control rights of the air conditioner to the access control rights of the file. For example, the access controls for an air conditioner resource may include a "set", a "raise", or a "find." Thus, the resource manager 224 would map a set access control bit to a write access control bit. The resource manager 224 would then update the ACL cache 226 with this mapped information. As such, a principal accessing the ACL cache would be able to control the air conditioner (if, of course, they were authenticated to do so) utilizing the file access controls. The resource manager 224 allows foreign notions of access control in the ACL cache 226 by adopting the semantics of various resources to the semantics of the resources inherent in the ACL cache.

Caching and Accessing Rights Methods Generally

Figure 11:
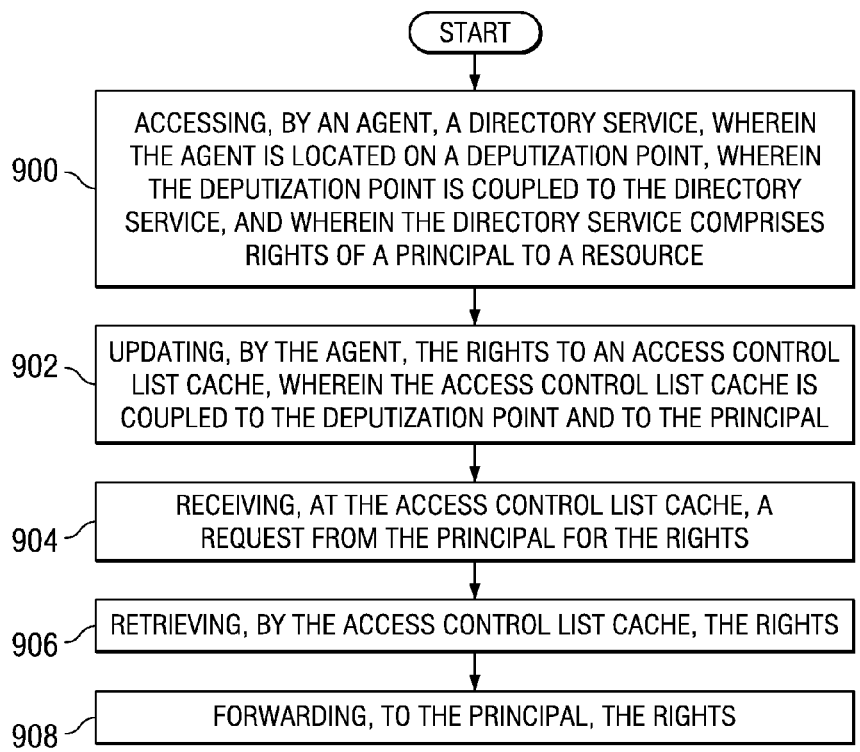
FIG. 11 is a flowchart illustrating a method of the present invention for caching and accessing rights in a distributed computing system.

FIG. 11 describes a method for caching and accessing rights in a distributed computing system (such as system 100), that may be implemented by the computer 112 of FIG. 1. The method begins at step 900 where an agent, that is located on a deputization point, accesses a directory service. The deputization point is coupled to the directory service that includes rights of principals to various resources. At step 902, the agent updates the rights to an access control list cache. The access control list cache is coupled to the deputization point and to the principal. The method proceeds to step 904 where the access control list cache receives a request from the principal for the rights. At step 906 the access control list cache retrieves the rights and, at step 908, forwards the rights to the principal.

Figure 12:
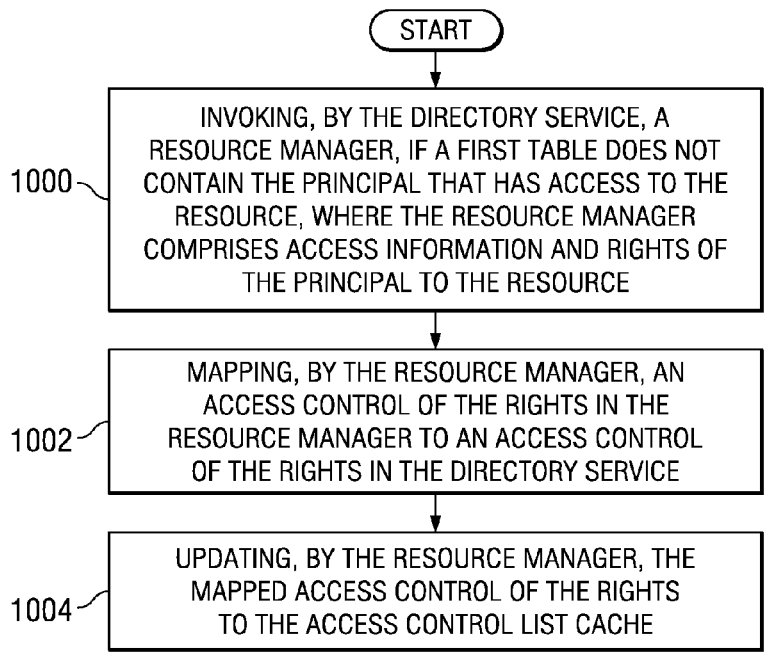
FIG. 12 is a flowchart illustrating a method of the present invention for providing to an ACL cache a right it does not contain in a distributed computing system.

FIG. 12 describes a method for providing to the ACL cache 226 certain rights it does not contain. The method begins at step 1000 where a directory service invokes a resource manager if Table 1 does not contain the principal that has access to the resource. The resource manager, which is coupled to the directory service, includes access information and rights of the principal to the resource (rights that the ACL cache 226 does not contain). At step 1002, the resource manager maps an access control of its right(s) to an access control of the right(s) contained in the directory service. The method proceeds to step 1004 where the resource manager updates the mapped access control of the right(s) to the ACL cache.

These components, in the distributed communication system, do not have to be directly coupled to one another. Rather, the information between these components may be remotely accessed (or communicated) via a plurality of communication links.

The present invention thus enjoys several advantages. One advantage is the ability to delegate rights in a distributed computing system through deputization. Deputization is useful in a variety of situations, including those which require the use of resources that are remote from a user and the user's normal environment. For instance, deputization could be used to perform tasks on a remote supercomputer or to use restricted software which must be run in a specific controlled environment.

Other advantages also exist. For example, the request for rights from an authorized principal are provided the very first time they are made. Additionally, certain rights can be placed in the ACL cache that it does not contain. With these improvements, processing time can be minimized thereby improving system efficiency and quality. These improvements are especially important as the "web-centric" world continues to expand.

It is understood that variations may be made in the foregoing without departing from the scope of the present invention. For example, additional networks, components (e.g. computers), and functions relating to deputization and caching and accessing rights that may be performed on those components, may be included in the distributed computing system. Also, the ACL cache may include a greater or fewer number of tables that contain additional information, existing tables may contain additional information, and/or the information in the tables may be combined. For example, the information from Table 1 and Table 2 in FIG. 10 may be combined to provide rights of a resource for a principal. Further, the tables may be fully inverted. For example, Table 1 is inverted on the resource name but can easily be inverted on the principal name. This could provide faster ACL access by the principal to the resource. Any of the entities (the agent, principal, ACL cache, etc.) may be contained on one or all of the components described. For example, the ACL cache may be located on the component (for example computer 112) housing the principal, the DDP, and/or the resource manager. Additionally, a separate ACL cache (such as ACL cache 227) may contain a user's (or user task's) rights to various resources so that the user 200 will be aware of the rights he/she has to various resource at the time of authentication. Further, the ACL cache 226 could be extended to interface between every principal in the principal node 206 and the DDP 202 so as to omit the need for a separate ACL cache.

It is further understood that other modifications, changes and substitutions are intended in the foregoing disclosure and in some instances some features of the disclosure will be employed without corresponding use of other features. Furthermore, singular discussion of items such as a right, principal, and resource is also meant to apply to situations where multiple rights, principals, and/or resources exist. Accordingly, it is appropriate that the appended claims be construed broadly and in a manner consistent with the scope of the disclosure.

What is claimed is:

1. A method for caching and accessing access rights to at least one resource in a distributed computing system, the method comprising:

accessing, by a software agent, a directory service, wherein the agent is located on a deputization point coupled to the directory service, and wherein the directory service comprises the access rights of a software principal to a resource;

updating, by the agent, the access rights in an access control list cache, wherein the access control list cache is coupled to the deputization point and to the principal;

receiving, at the access control list cache, a request from the principal or the access rights stored in the access control list cache;

retrieving, from the access control list cache, the access rights;

forwarding, to the principal, the access rights;

delegating one or more of the principal's access rights to at least one software entity; and accessing the resource, by the software entity, using the delegated access rights without requiring intervention of the principal to authenticate access requests by the software entity, wherein tasks can be accomplished by the software entity without control by the principal.

2. The method of claim 1, wherein the access control list cache is comprised of a first table comprising the principal that has access to the resource.

3. The method of claim 1, wherein the access control list cache is comprised of a second table comprising the access rights of the principal to the resource.

4. The method of claim 1, wherein the access control list cache is comprised of a third table comprising a cached access to the resource object.

5. The method of claim 2 further comprising invoking, by the directory service, a resource manager, if the first table does not contain the principal that has access to the resource, wherein the resource manager is coupled to the directory service and comprises access information and access rights of the principal to the resource.

6. The method of claim 5 further comprising mapping, by the resource manager, an access control of the access rights in the resource manager to an access control of the rights in the directory service.

7. The method of claim 6 further comprising updating, by the resource manager, the mapped access control of the access rights to the access control list cache.

8. The method of claim 1, further comprising at least one of the following actions from the group consisting of:
asynchronously updating, by the agent to the access control list cache, the access rights, when the access rights are added to the directory service;
asynchronously updating, by the agent to the access control list cache, the access rights, when the access rights are removed from the directory service;
asynchronously updating, by the agent to the access control list cache, the access rights, when the request from the principal is received;
synchronously updating, by the agent to the access control list cache, the access rights, when the access rights are added to the directory service;
synchronously updating, by the agent to the access control list cache, the access rights, when the access rights are removed from the directory service;
synchronously updating, by the agent to the access control list cache, the access rights, when the request from the principal is received;
updating, at a scheduled time, the access rights by the agent to the access control list cache; and
updating, after a time to live has expired, the access rights by the agent to the access control list cache.

9. A distributed computing system supporting access control caching, the system comprises:
a plurality of computers, each having a memory and a processor;
a plurality of communication links connecting the plurality of computers;
a principal located on a first one of the computers;
an agent located on a second one of the computers;
a resource located on a third one of the computers;
a first set of access rights located on a fourth one of the computers;
a second set of access rights located on a fifth one of the computers;
means for accessing, by the agent, the first set of access rights of the principal to the resource;
means for updating, by the agent, the first set of access rights to an access control list cache, wherein the access control list cache is located on a sixth one of the computers;
means for receiving, at the access control list cache, a request from the principal for the first set of access rights;
means for retrieving, by the access control list cache, the first set of access rights;
means for forwarding, to the principal, the first set of access rights; and
means for providing, to the principal, a deputization certificate adapted for enabling the principle to copy one or more of the principal's access rights to at least one software entity.

10. The system of claim 9 further comprises means for invoking the second set of access rights, if the first set of access rights is not located on the fourth one of the computers.

11. The system of claim 10 further comprises means for mapping an access control of the second set of access rights to an access control of the first set of access rights.

12. The system of claim 11 further comprises, means for updating the access control list cache with the mapped access control of the first set of access rights.

13. A computer storage medium having a configuration that represents data and instructions which will cause performance of method steps for caching and accessing access rights in a distributed computing system, the method comprising:
accessing, by a software agent, a directory service, wherein the agent is located on a deputization point coupled to the directory service having the access rights of at least one principal to at least one resource;
updating, by the agent, the access rights to an access control list cache, wherein the access control list cache is coupled to the deputization point, and wherein the access control list cache is coupled to the principal;
receiving, at the access control list cache, a request from the principal for the access rights;
retrieving, by the access control list cache, the access rights;
forwarding, to the principal, the access rights;
forwarding, to the principal, a deputization credential empowering the principal to deputize software entities; and
deputizing, by the principal, at least one of the software entities, wherein the software entity can exercise one or more of the principal's access rights due to the deputization.

14. The configured storage medium of claim 13 further comprising invoking, by the directory service, a resource manager, if the access control list cache does not contain one of the access rights, wherein the resource manager is coupled to the directory service, and wherein the resource manager comprises the one right.

15. The configured storage medium of claim 14 further comprising mapping, by the resource manager, an access control of the one right to an access control of the access rights.

16. The configured storage medium of claim 15 further comprising updating, by the resource manager, the mapped access control of the access rights to the access control list cache.

17. A method for controlling access within a computer system using deputization, the method comprising:

receiving an access authorization request at a deputization point from a principal, wherein the access authorization request requests validation of the principal's identity;

determining whether to validate the principal based on the access authorization request;

identifying one or more resource access permissions for the principal if the principal is validated, wherein the resource access permissions enable the principal to access one or more resources; and providing the principal with deputizing authority at the identified access authorization level, wherein the deputizing authority comprises a deputization credential that enables the principal to give at least one software entity within the computer system a level of resource access permission equal to or lesser than the principal's resource access permissions.

18. The method of claim 17 wherein determining whether to validate the principal includes comparing information present in the access authorization request to a plurality of access rights contained in an access control list cache.

19. The method of claim 18 further comprising:

invoking a resource manager if the access control list cache does not contain an access right associated with the access authorization request;

locating the access right associated with the access authorization request; and mapping the access right into the plurality of access rights.

20. The method of claim 17 further comprising deputizing, by the principal, a first software entity, wherein the first software entity has a level of resource access permission equal to or lesser than the principal's resource access permissions.

21. The method of claim 20 wherein deputizing includes defining a lifespan of the deputization.

22. The method of claim 20 further comprising deputizing, by the first software entity, a second software entity, wherein the second software entity has a level of resource access permission equal to or lesser than the first software entity's level of resource access permission.

23. A computer-executable method for delegating permission from a software principal to a software deputy within a computer network to access at least one resource that is accessible to the principal, the method comprising:

receiving a request from the principal for a deputy credential, wherein the request includes the principal's identity and at least one permission to be assigned to the deputy;

sending the deputy credential to the principal, wherein the deputy credential enables the principal to assign the permission to the resource to the deputy;

receiving a deputization request from the principal to assign the permission to the deputy; and assigning the permission to the deputy, wherein the deputy can independently access the resource using the assigned permission without being controlled by the principal.

24. The method of claim 23 further comprising imposing a lifespan on the assignment of the permission, wherein the assignment will expire at the end of the lifespan.

25. The method of claim 23 further comprising imposing a lifespan on the deputy, wherein the deputy will terminate at the end of the lifespan.

26. The method of claim 23 further comprising:

determining if a deputy identified in the deputization exists; and creating the deputy if the deputy does not exist.

27. The method of claim 26 further comprising identifying a start time in the deputization request for assigning the permission to the deputy, wherein the permission is not assigned to the deputy until the start time.

28. The method of claim 27 wherein the principal is terminated in the computer network prior to the start time.

29. The method of claim 23 further comprising verifying that the principal is permitted to access the resource prior to sending the deputy credential to the principal.

30. The method of claim 23 wherein the deputy is in a namespace that is not accessible to the principal, and wherein the deputy can use the permission to access a resource in the namespace that is not accessible to the principal.

31. The method of claim 23 wherein the request from the principal for a deputy credential includes a plurality of permissions to be assigned to the deputy, and wherein the deputy credential sent to the principal permits the principal to assign only a portion of the plurality of permissions to the deputy.

32. The method of claim 23 further comprising receiving a second request from the principal for a second deputy credential, wherein the request includes the principal's identity and at least a second permission to be assigned to the deputy;

sending the second deputy credential to the principal; and assigning the second permission contained in the second deputy credential to the deputy, wherein the deputy includes permissions from both the deputy credential and the second deputy credential.

* * * * *